US011294385B2

(12) United States Patent
Mordovanakis et al.

(10) Patent No.: US 11,294,385 B2
(45) Date of Patent: Apr. 5, 2022

(54) SYSTEM AND METHOD FOR GENERATING A REPRESENTATION OF AN ENVIRONMENT

(71) Applicant: Robert Bosch GmbH, Stuttgart (DE)

(72) Inventors: Aghapi Mordovanakis, Ann Arbor, MI (US); Krishna Chinni, Canton, MI (US); Rajani Janardhana, San Jose, CA (US); Miklos Halasz, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 16/456,098

(22) Filed: Jun. 28, 2019

(65) Prior Publication Data
US 2020/0409373 A1    Dec. 31, 2020

(51) Int. Cl.
G05D 1/02    (2020.01)
G05D 1/00    (2006.01)

(52) U.S. Cl.
CPC ......... G05D 1/0214 (2013.01); G05D 1/0088 (2013.01); G05D 1/0248 (2013.01); G05D 1/0278 (2013.01); G05D 2201/0213 (2013.01)

(58) Field of Classification Search
CPC .. G05D 1/0214; G05D 1/0088; G05D 1/0248; G05D 1/0278; G05D 1/0246; G05D 1/0094; G05D 1/0231; G05D 1/0212; G05D 1/0274; G05D 1/0257; G05D 2201/0213; G05D 2201/02; B60W 30/095; B60W 30/10; B60W 60/0011; B60W 60/0015; B60W 2554/80; B60W 2554/20; B60W 50/14; B60W 2520/06; B60W 2556/40

See application file for complete search history.

(56) References Cited

U.S. PATENT DOCUMENTS

| | | | |
|---|---|---|---|
| 8,897,947 B2 * | 11/2014 | Nakano ................ | G05D 1/0238 701/25 |
| 9,440,651 B2 | 9/2016 | Schroeder et al. | |
| 9,557,741 B1 * | 1/2017 | Elie ...................... | G05D 1/0088 |
| 9,669,830 B2 | 6/2017 | Weisswange | |
| 9,809,218 B2 | 11/2017 | Elie et al. | |
| 10,503,172 B2 * | 12/2019 | England ............... | G05D 1/0217 |
| 2006/0106534 A1 | 5/2006 | Kawamata et al. | |
| 2017/0248960 A1 | 8/2017 | Shashua et al. | |

(Continued)

Primary Examiner — Thomas G Black
Assistant Examiner — Brandon Z Willis
(74) Attorney, Agent, or Firm — Kathy Takeguchi; Maginot, Moore & Beck LLP

(57) ABSTRACT

A method includes obtaining an occupancy grid. The method includes generating a reference, such as a ray, on the occupancy grid. The ray originates from a location of a vehicle and extends in a direction that corresponds to a driving direction of the vehicle. The method includes identifying markers along the ray. The markers include transition markers, which indicate a first type of transition or a second type of transition. The first type of transition is from an unoccupied zone to an occupied zone. The second type of transition is from the occupied zone to the unoccupied zone. The method includes generating a representation of drivable space in real-time based on computations involving sections that are associated with the first type of transition and the second type of transition. The method includes providing guidance to the vehicle based on the representation of drivable space.

18 Claims, 6 Drawing Sheets

(56) References Cited

U.S. PATENT DOCUMENTS

| | | | |
|---|---|---|---|
| 2019/0286153 A1* | 9/2019 | Rankawat | G06T 7/11 |
| 2019/0294181 A1* | 9/2019 | Ohno | G05D 1/0238 |
| 2020/0103914 A1* | 4/2020 | Holz | G05D 1/0088 |
| 2020/0202107 A1* | 6/2020 | Ozkucur | G06K 9/6215 |

* cited by examiner

SYSTEM AND METHOD FOR GENERATING A REPRESENTATION OF AN ENVIRONMENT

FIELD

This disclosure relates generally to generating a representation of an environment.

BACKGROUND

In general, autonomous vehicles, semi-autonomous vehicles, and highly-autonomous vehicles rely on sensors to construct models of environments. In general, these models are used to plan, predict, and execute trajectory plans for these vehicles. For example, one type of model includes an occupancy grid with cells. In the occupancy grid, each cell includes properties that indicate an occupancy probability for that cell and/or an unoccupied probability for that cell. However, in order to represent the environment with sufficient resolution, these occupancy grids are often associated with a relatively large memory footprint. With this large demand for memory space, the occupancy grid is not suitable for implementation in some memory-limited hardware systems. In addition, due to its relatively large memory footprint, there are many instances in which a vehicle is unable to ensure fast and reliable transfer of the occupancy-grid between various subsystems of the vehicle and/or to other external systems (e.g., other vehicles on the roadway).

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a method is implemented via a control system with at least one processing device. The method includes obtaining an occupancy grid for a region based on sensor data and map data in which the occupancy grid indicates at least an occupied zone and an unoccupied zone for the region. The method includes generating a reference tool on the occupancy grid in which the reference tool includes a ray that originates from a location of a vehicle and extends in a direction that corresponds to a driving direction of the vehicle. The method includes identifying markers along the ray. The markers include at least (i) a first transition marker exhibiting a first type of transition from the unoccupied zone to the occupied zone along the direction of the ray and (ii) a second transition marker exhibiting a second type of transition from the occupied zone to the unoccupied zone along the direction of the ray. The method includes identifying a first section associated with the first transition marker as being a drivable region upon determining that the first transition marker exhibits the first type of transition. The method includes identifying a second section associated with the second transition marker as being a non-drivable region upon determining that the second transition marker exhibits the second type of transition. The method includes generating a representation of the drivable space in real-time based on computations involving the drivable region and the non-drivable region. The method includes providing guidance to the vehicle based on localization data of the vehicle in relation to the representation of the drivable space.

In an example embodiment, a system includes a sensor system and a control system. The sensor system includes a plurality of sensors. The control system is communicatively connected to the sensor system. The control system includes at least one electronic processor. The control system is configured to obtain an occupancy grid for a region based on sensor data and map data in which the occupancy grid indicates at least an occupied zone and an unoccupied zone for the region. The control system is configured to generate a reference tool on the occupancy grid in which the reference tool includes a ray that originates from a location of a vehicle and extends in a direction that corresponds to a driving direction of the vehicle. The control system is configured to identify markers along the ray. The markers include at least (i) a first transition marker exhibiting a first type of transition from the unoccupied zone to the occupied zone along the direction of the ray and (ii) a second transition marker exhibiting a second type of transition from the occupied zone to the unoccupied zone along the direction of the ray. The control system is configured to identify a first section associated with the first transition marker as being a drivable region upon determining that the first transition marker exhibits the first type of transition. The control system is configured to identify a second section associated with the second transition marker as being a non-drivable region upon determining that the second transition marker exhibits the second type of transition. The control system is configured to generate a representation of the drivable space in real-time based on computations involving the drivable region and the non-drivable region. The control system is configured to provide guidance to the vehicle based on localization data of the vehicle in relation to the representation of the drivable space.

In an example embodiment, at least one non-transitory computer readable medium includes computer readable instructions, which are executable by a computer processor to implement a method. The method includes obtaining an occupancy grid for a region based on sensor data and map data in which the occupancy grid indicates at least an occupied zone and an unoccupied zone for the region. The method includes generating a reference tool on the occupancy grid in which the reference tool includes a ray that originates from a location of a vehicle and extends in a direction that corresponds to a driving direction of the vehicle. The method includes identifying markers along the ray. The markers include at least (i) a first transition marker exhibiting a first type of transition from the unoccupied zone to the occupied zone along the direction of the ray and (ii) a second transition marker exhibiting a second type of transition from the occupied zone to the unoccupied zone along the direction of the ray. The method includes identifying a first section associated with the first transition marker as being a drivable region upon determining that the first transition marker exhibits the first type of transition. The method includes identifying a second section associated with the second transition marker as being a non-drivable region upon determining that the second transition marker exhibits the second type of transition. The method includes generating a representation of the drivable space in real-time based on computations involving the drivable region and the non-drivable region. The method includes providing guidance to the vehicle based on localization data of the vehicle in relation to the representation of the drivable space.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives failing with the spirit and scope of this disclosure.

Figure 1:
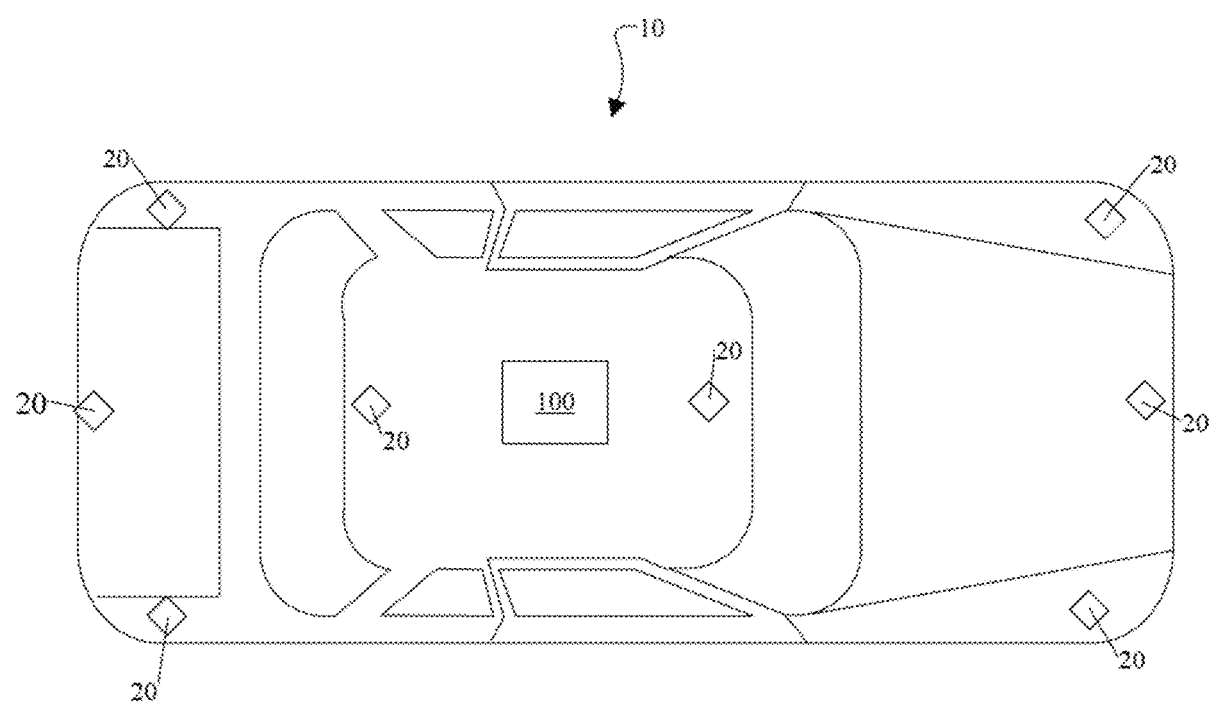
FIG. 1 is a conceptual diagram of a non-limiting example of a vehicle that includes a system for representing an environment according to an example embodiment of this disclosure.

FIG. 1 is a conceptual diagram of a vehicle 10, which includes a system 100 for generating at least one representation of drivable space for a region in real-time. Also, the system 100 is configured to provide guidance to the vehicle 10 in accordance with the representation of drivable space. In addition, the system 100 is configured to control the vehicle 10 in accordance with this guidance. In FIG. 1, for instance, the system 100 is advantageously applied to the vehicle 10, which is configured to be driven autonomously, semi-autonomously, non-autonomously, or any combination thereof. However, the control system 140 and/or system 100 is not limited to vehicular applications, but is also applicable to various other applications. For example, the control system 140 is beneficial to various applications and/or other systems that rely on determining a suitable and safe space for mobility in real-time. In this regard, for instance, the control system 140 is applicable to any mobile machine (e.g., a mobile robot), any suitable application system (e.g., a navigation system), or any combination thereof.

In an example embodiment, the vehicle 10 and/or system 100 includes one or more sensors 20. Each of the sensors 20 provides the system 100 with corresponding sensor data via wired technology, wireless technology, or any suitable communication technology. In this regard, FIG. 1 merely illustrates a conceptual diagram that shows various sensors 20, which are placed at various locations of the vehicle 10 such that these sensors 20 are enabled to sense one or more aspects of an environment in relation to the vehicle 10 in real-time. In an example embodiment, the various sensors 20 are configured to provide output data to corresponding electronics for processing. For instance, the various sensors 20 include a light detection and ranging (LIDAR) sensor, a camera, an odometer, a radar sensor, a satellite-based sensor (e.g., global positioning system (GPS), Galileo, Global Navigation Satellite System (GLONASS), or any satellite-based navigation technology), an inertial measurement unit (IMU), an ultrasonic sensor, an infrared sensor, any suitable sensor, or any combination thereof. In addition, the system 100 includes other components, as discussed with respect to FIG. 2.

Figure 2:
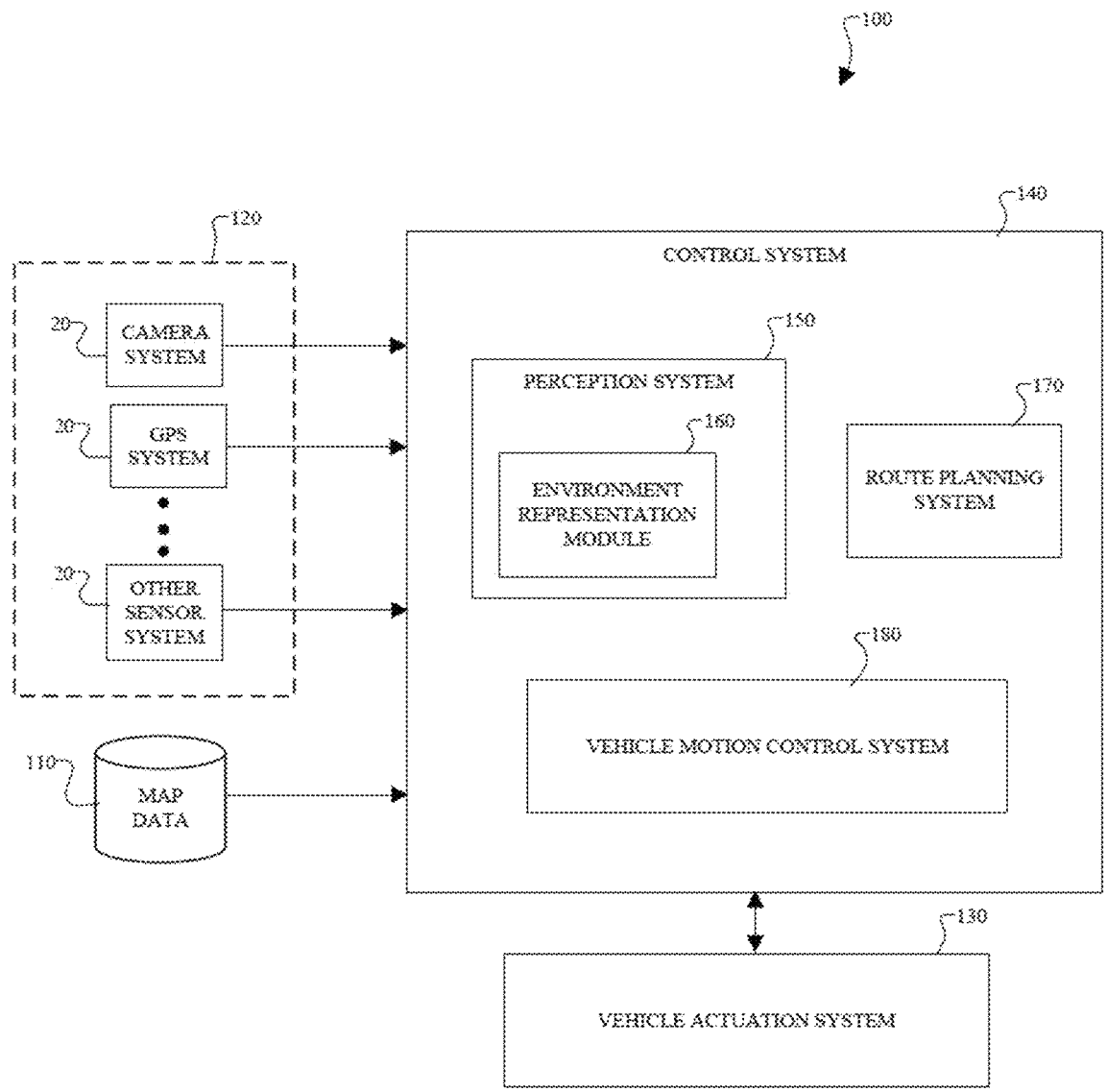
FIG. 2 is a block diagram of the system of FIG. 1 according to an example embodiment of this disclosure.

FIG. 2 is a block diagram of the system 100, which is configured to provide at least a representation of at least one region of an environment in real-time according to an example embodiment. For example, in FIG. 2, the system 100 includes at least a map system 110, a sensor system 120, a vehicle actuation system 130, and a control system 140. Additionally or alternatively, the system 100 is configured to include one or more other components, which are not specifically mentioned herein, provided that the system 100 is enabled to provide the functions described herein.

In an example embodiment, the map system 110 includes various map data, which are stored in a memory system. In an example embodiment, the memory system includes at least one non-transitory computer readable medium. For example, the memory system includes semiconductor memory, random access memory (RAM), read only memory (ROM), an electronic storage device, an optical storage device, a magnetic storage device, memory circuits, any suitable memory technology, or any suitable combination thereof. In an example embodiment, the map data includes at least a high-definition map. In an example embodiment, the map data includes various levels of features, such as roads, lanes, road-markings, buildings, signs, bridges, traffic lights, landmarks, other relevant features in the environment, and/or any combination thereof. In FIG. 2, the map system 110 is communicatively connected to the control system 140 such that various map data are accessed by and/or provided to the control system 140.

In an example embodiment, the sensor system 120 includes various sensors 20, which are configured to provide sensor data of an environment. More specifically, as shown in FIGS. 1-2, the sensor system 120 includes various sensors 20 that are associated with the vehicle 10. For example, the sensor system 120 includes at least a camera system, a satellite-based sensor system (e.g., GPS, any global navigation satellite system, etc.), a LIDAR system, a radar system, an infrared system, an odometer, an IMU, any suitable sensor, or any combination thereof. In response to detections from the sensors 20, the sensor system 120 is configured to transfer sensor data to the control system 140. Additionally or alternatively, the sensor system 120 includes sensor-fusion technology, which is configured to generate sensor-fusion data based on the sensor data and then provide this sensor-fusion data to the control system 140.

In an example embodiment, the vehicle actuation system 130 includes components, which relate to control of the vehicle. More specifically, for example, the vehicle actuation system 130 is configured to provide actuations relating to steering, braking, and driving the vehicle 10. In this regard, the vehicle actuation system 130 includes mechanical components, electrical components, electronic components, electromechanical components, any suitable components (e.g., software components), or any combination thereof. In an example embodiment, the vehicle actuation system 130 is configured to engage one or more of these components to control the vehicle 10 in response to communications received from the control system 140. For example, the vehicle actuation system 130 is configured to actuate and/or control the vehicle 10 based on a route, which is determined in accordance with the representation of drivable space via the control system 140.

In an example embodiment, the control system 140 is configured to obtain map data from the map system 110 and sensor data from the sensor system 120. In addition, the control system 140 is configured to generate a representation of drivable space in real-time based at least on the sensor data and map data. The control system 140 is also operable to provide a number of other functions, as described herein and as shown, for example, in at least FIGS. 3A-3B. In this regard, the control system 140 includes one or more processing devices, one or more memory devices and one or more input/output (I/O) interfaces. For example, the control system 140 includes an electronic processor, a computer processor, a central processing unit (CPU), a graphics processing unit (GPU), an application specific integrated circuit (ASIC), a field programmable gate array (FPGA), various processing circuits, any suitable processing hardware, or any combination thereof. Additionally or alternatively, in an example embodiment, the control system 140 includes software (e.g., computer readable instructions, computer code, software routines, software modules, libraries, etc.) to implement one or more of the functions described herein.

Referring to FIG. 2, as an example, the control system 140 includes at least a perception system 150, an environment representation module 160, a route planning system 170, and a vehicle motion control system 180, whereby at least one processor, memory, I/O interface, and software module, as discussed earlier, are incorporated in one or more of the components of this configuration. In an example embodiment, the perception system 150, the environment representation module 160, the route planning system 170, and the vehicle motion control system 180 are configured to cooperate with each other to provide guidance and/or control signals to the vehicle actuation system 130 such that the vehicle 10 is controlled based on the drivable space. Alternatively, the control system 140 is not limited to the components and the configuration shown in FIG. 2, but can include other modules, systems, and configurations that are operable to provide the functions described herein.

In an example embodiment, the perception system 150 is configured to obtain map data from the map system 110 and sensor data from the sensor system 120. In this regard, the perception system 150 is configured to provide a perception of the environment. More specifically, in FIG. 2, for instance, the perception system 150 includes the environment representation module 160, which is configured to generate a representation of drivable space based on localization data (e.g., location data, orientation data, etc.) of the vehicle 10. In an example embodiment, the environment representation module 160 includes software, hardware, or a combination thereof. In FIG. 2, the environment representation module 160 is provided as a part of the perception system 150, but can be provided in other configurations in relation to the system 100 provided that the system 100 is operable to provide the functions described herein. In an example embodiment, the route planning system 170 is configured to provide guidance to the vehicle 10. In this regard, for example, the route planning system 170 is configured to generate a route for driving the vehicle 10 that takes into account the representation of drivable space. The route planning system 170 is configured to ensure that the vehicle 10 is provided with a route, which is at least positioned within the bounds of the drivable space and/or avoids the non-drivable space. In an example embodiment, the vehicle motion control system 180 is configured to provide control signals to the vehicle actuation system 130, which is responsive to the control signals and configured to provide corresponding actuations to control the vehicle 10.

In an example embodiment, the system 100 includes communication technology and/or network technology, which enables various communications among the various components of FIGS. 1-2. In an example embodiment, for instance, the vehicle 10 and/or the system 100 includes controller area network (CAN) technology, wired communication technology, wireless communication technology, any suitable networking technology, or any combination thereof to enable the components to communicate with each other. Also, in an example embodiment, the vehicle 10 and/or system 100 includes communication technology, which enables the vehicle 10 and/or system 100 to communicate with at least one other communication system (e.g., vehicle-to-infrastructure communication, vehicle-to-vehicle communication, etc.). For example, the system 100 is configured to transmit a representation of drivable space to another entity (e.g., another compatible vehicle, another application system, etc.), which is communicatively connected to the system 100. In an example embodiment, the system 100 and its components are local to the vehicle 10. Alternatively, in another example embodiment, the system 100 includes one or more components, which are remote to the vehicle 10 while also being communicatively connected to one or more components that are local to the vehicle 10. Additionally or alternatively, the system 100 is configured to include one or more other components, which are not specifically mentioned herein, provided that the system 100 is configured to provide the functions described herein.

Figure 3A:
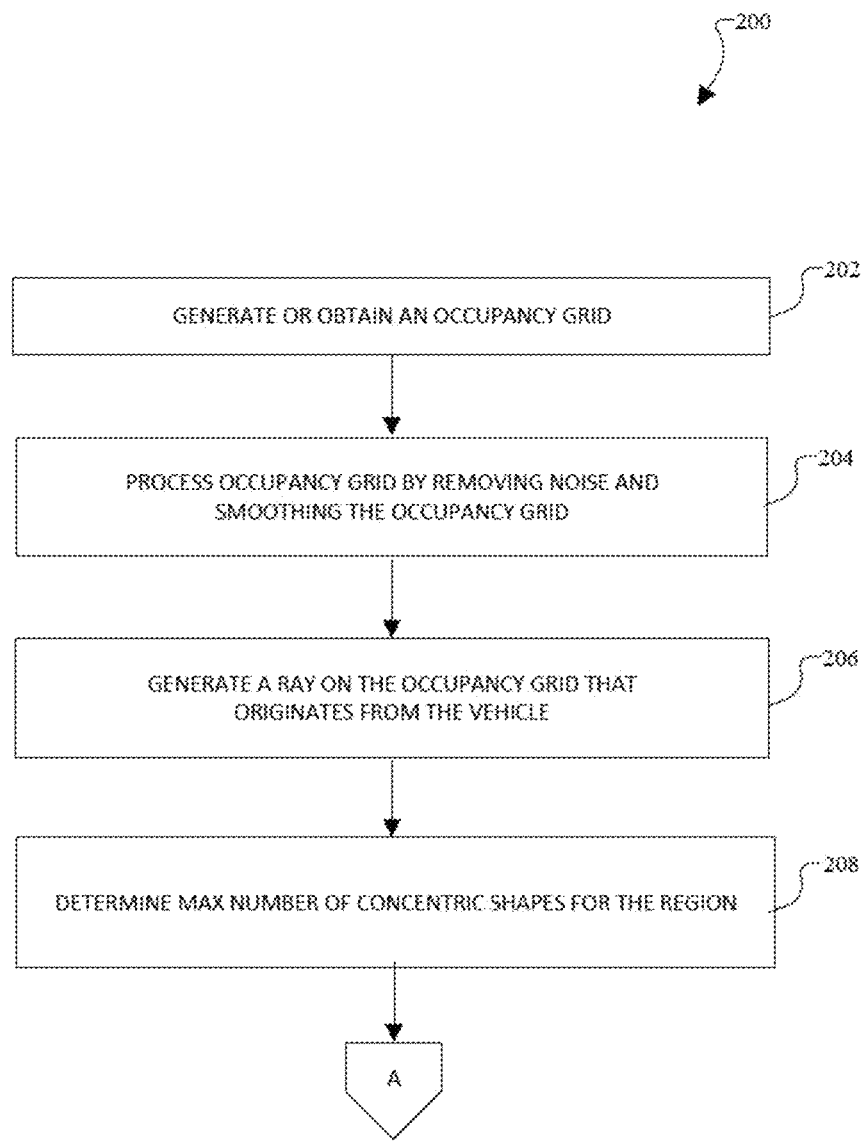
FIGS. 3A and 3B are flow charts of a method for representing an environment according to an example embodiment of this disclosure.
Figure 3B:
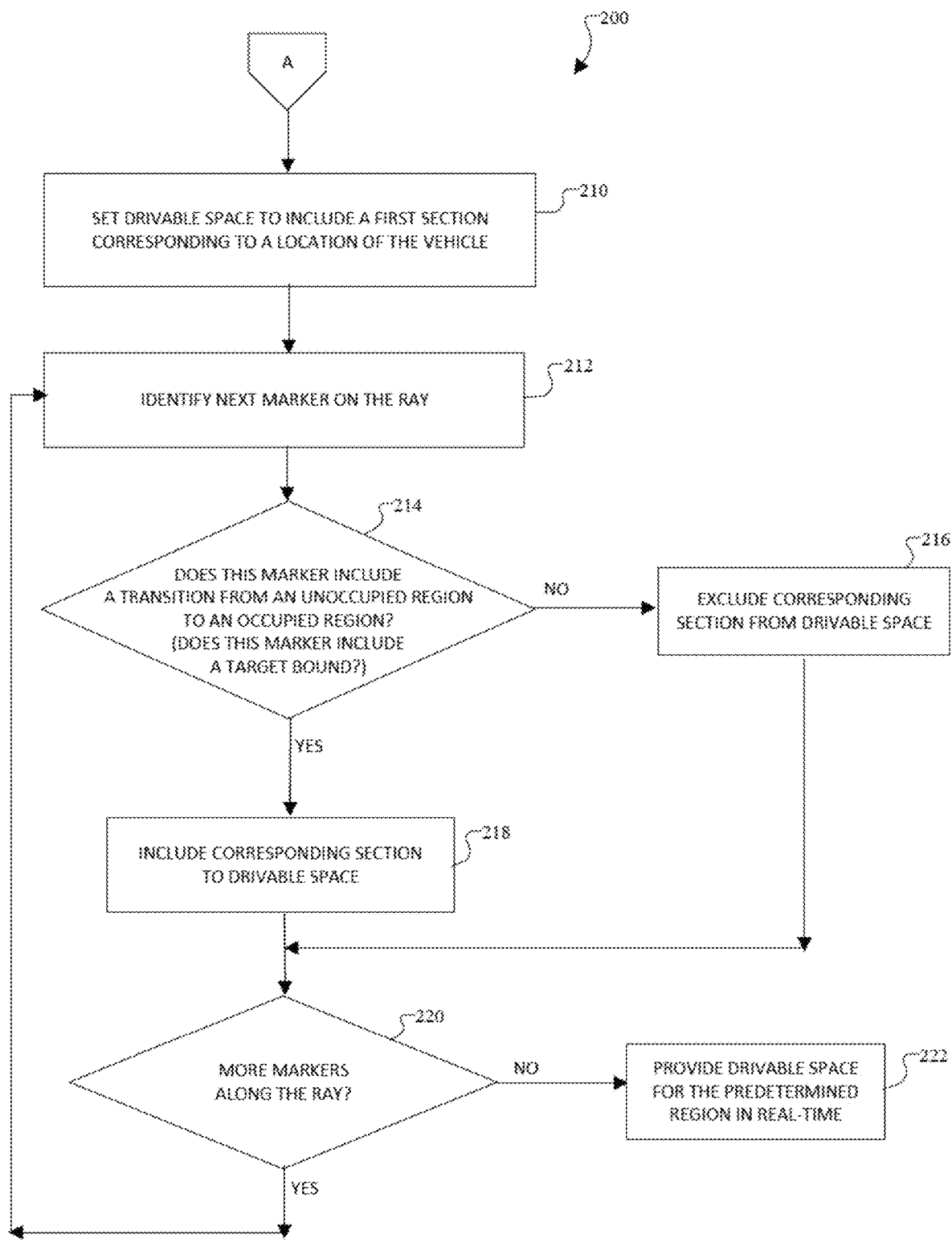
Figure 4:
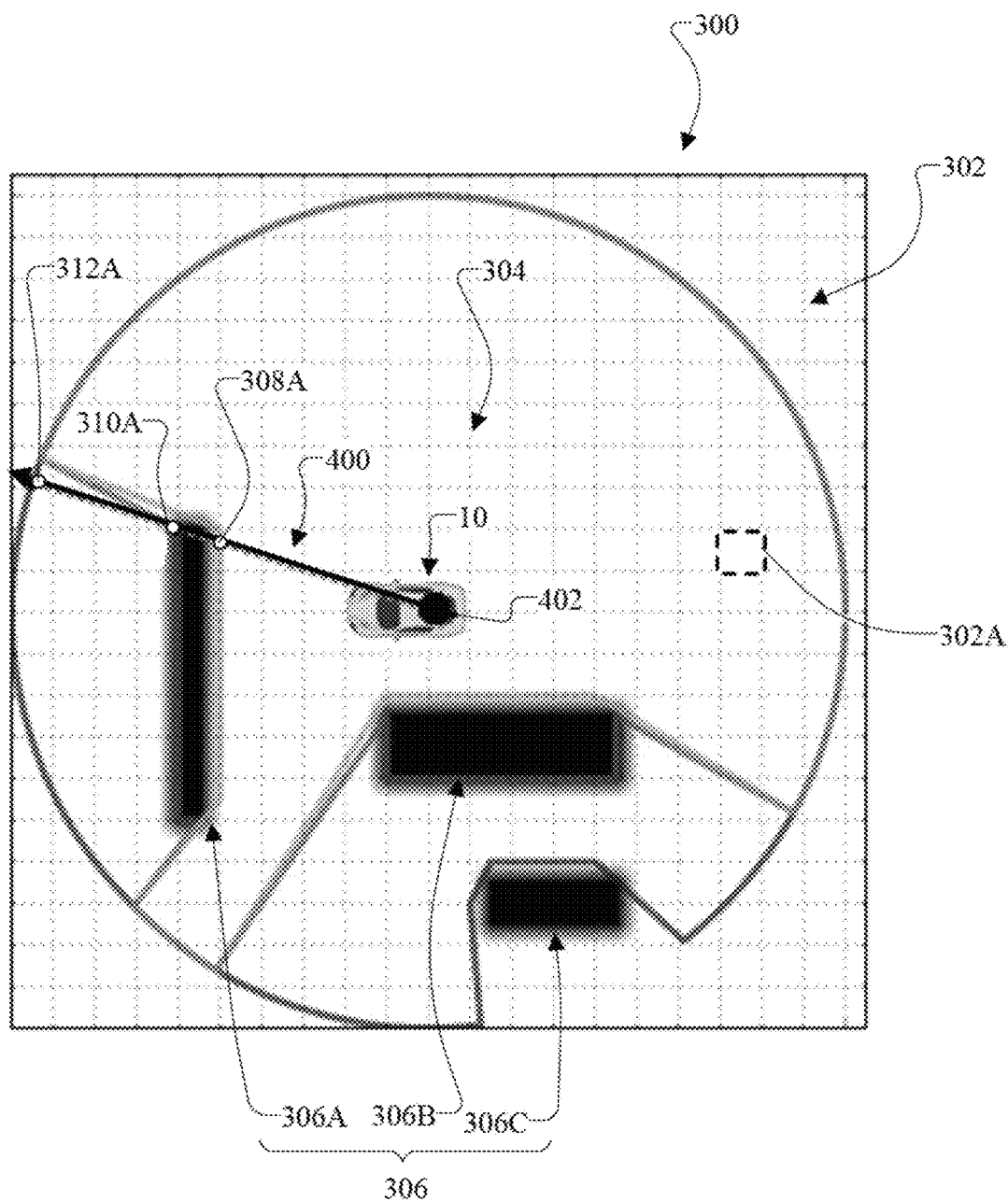
FIG. 4 is a conceptual diagram of a non-limiting example of a visualization of a process of representing an environment according to an example embodiment of this disclosure.
Figure 5A:
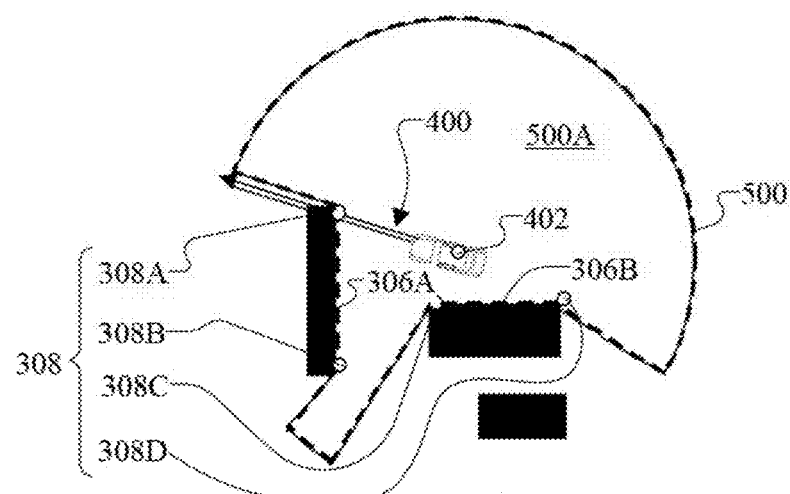
FIGS. 5A, 5B, and 5C are diagrams that represent various sections that are used in generating the representation of the drivable space according to an example embodiment of this disclosure.
Figure 5B:
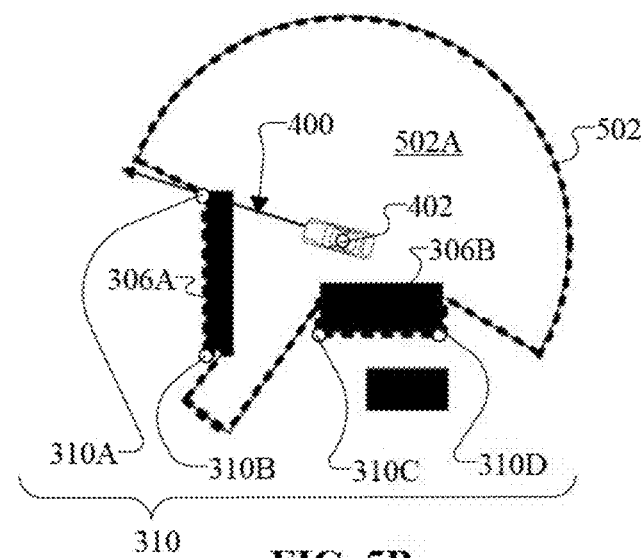
Figure 5C:
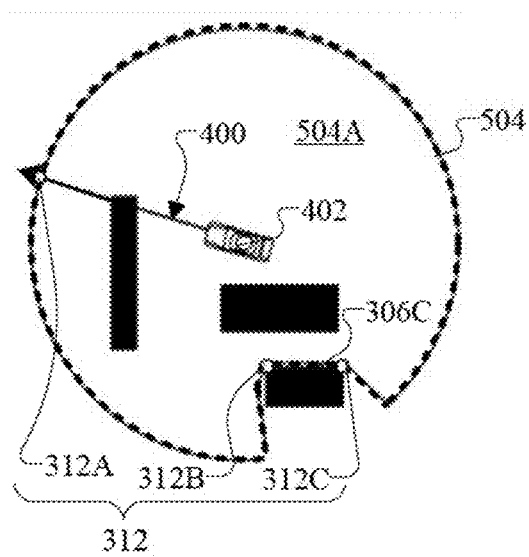

FIGS. 3A-3B, FIG. 4, and FIGS. 5A-5C relate to a method 200 for representing an environment via a drivable space model according to an example embodiment. More specifically, FIGS. 3A-3B illustrate a flowchart of this method 200, which is executable by any suitable hardware technology, software technology, or any combination of hardware and software technology. In an example embodiment, for instance, the method 200 is implemented by the system 100, particularly the control system 140, as shown in FIG. 2. In addition, FIG. 4 illustrates a visualization 300 of a non-limiting example of a two-dimensional (2D), top-view representation of the drivable space model while FIGS. 5A-5C illustrate various sections that are used in generating the representation of the drivable space model.

At step 202, in an example embodiment, the control system 140 is configured to generate or obtain an occupancy grid 302 based on map data and sensor data. In an example embodiment, the occupancy grid 302 includes indications of at least one occupied zone and/or at least one unoccupied zones based on map data and sensor data obtained in a region. For example, in FIG. 4, the occupancy grid 302 provides a 2D, top-view of the region along with indications of at least one occupied zone and at least one unoccupied zone. Also, in an example embodiment, the control system 140 is configured to implement, for example, Bresenham's line algorithm to obtain one or more lines, which assist in delineating and/or marking bounds of these different zones. For example, FIG. 4 illustrates a non-limiting example of a visualization 300 that includes a layer of an occupancy grid 302, which is generated via the perception system 150.

In an example embodiment, as shown in FIG. 4, the occupancy grid 302 includes cells 302A. Each cell 302A or a group of cells 302A includes occupancy data relating to a probability of "occupancy" (e.g. unsuitable space for vehicle mobility) and/or a probability of "vacancy" (e.g., unoccupied space or suitable space for vehicle mobility). The occupancy grid 302 includes at least an occupied zone, an unoccupied zone, or a combination thereof. In general, an occupied zone includes one or more cells 302A, which are indicated as being occupied based on a comparison of a probability of occupancy/vacancy for one or more of those cells 302A relative to a threshold level. Also, an unoccupied zone includes one or more cells 302A, which are indicated as being unoccupied based on a comparison of a probability of vacancy/occupancy for one or more of those cells 302A relative to a threshold level. In an example embodiment, upon obtaining the occupancy grid 302 or any similar sensor-based representation providing occupancy and/or "vacancy" information for a geographic region, the control system 140 is configured to perform step 204.

At step 204, in an example embodiment, the control system 140 is configured to process the occupancy grid 302 to enhance the clarity thereof, thereby ensuring greater accuracy in the results that are obtained based on the occupancy grid 302. In this regard, for instance, the control system 140 is configured to filter the occupancy grid 302 to remove noise and/or smooth the occupancy grid 302, which comprises image data. For example, as shown in FIG. 4, the occupancy grid 302 has been filtered such that there is minimal noise (e.g., substantially little to no noise) with respect to the unoccupied zone 304 in relation to the occupied zones 306 (e.g., occupied zone 306A, occupied zone 306B, and occupied zone 306C). As a non-limiting example, in FIG. 4, each unoccupied zone 304 is represented by an unshaded region (e.g., absence of one or more pixel colors) whereas each of the occupied zones 306 is represented by a shaded region (e.g., presence of one or more pixel colors). This differentiation in pixel data (e.g., pixel color) between at least one unoccupied zone 304 and at least one occupied zone 306 is advantageous in enabling the control system 140 to determine a transition between different zones such as (i) a transition between an unoccupied zone 304 and an occupied zone 306 and (ii) a transition between an occupied zone 306 and an unoccupied zone 304 with ease and clarity. In an example embodiment, upon filtering the occupancy grid 302, the control system 140 is configured to perform step 206.

At step 206, in an example embodiment, the control system 140 is configured to generate a reference tool in relation to the occupancy grid 302. For example, the control system 140 is configured to generate a reference tool that includes at least one ray 400, which starts at a source location 402. In this case, the source location 402 corresponds to the localization data (e.g., location data and orientation data) of the vehicle 10, as determined by one or more sensors 20 in accordance with map data and at least one localization technique. Also, in FIG. 4, the ray 400 extends outward from the vehicle 10 and in a direction that corresponds to a driving direction of the vehicle 10. In an example embodiment, upon generating the reference tool, such as the ray 400, the control system 140 is configured to perform step 208.

At step 208, in an example embodiment, the control system 140 is configured to determine a set of shapes for the region in which the set includes a maximum and/or an odd number of shapes. For example, in FIG. 4, the control system 140 is configured to generate shapes, which are concentric or substantially concentric with respect to the source location 402. In this regard, for instance, the region (denoted as 'R') includes a set of concentric shapes (denoted as $S_1$ to $S_m$ in which "m" refers to an odd integer greater than one), as expressed by the following expression:

$$R=[S_1, \ldots S_m] \qquad \text{[Equation 1]}$$

In an example embodiment, the control system 140 is configured to generate these shapes (i.e., shapes $S_1$ to $S_m$) for the region (i.e. 'R') based on information, such as boundary data of the occupied zones, which are obtained from the occupancy grid 302. More specifically, the control system 140 is configured to identify vertices of the occupied zones 306 and generate concentric shapes (e.g., polygons or various closed shapes that include vertices) based on the vertices of the occupied zones 306 in any suitable coordinate system. As a non-limiting example, a given shape (denoted as $S_i$) is represented by a list of 'n' vertices in which 'n' represents an integer number and $(r_j, \theta_j)$ represents a vertex in polar coordinates, as indicated by the following expression:

$$S_i=[(r_1,\theta),(r_n,\theta_n)] \qquad \text{[Equation 2]}$$

In an example embodiment, for instance, the control system 140 is configured to generate a shape in accordance with a set of one or more vertices, which are selected from one or more of the occupied zones 306. For example, the control system 140 is configured to generate a first shape with a first set of vertices of one or more occupied zones 306. For instance, as shown in FIG. 5A, the first set 308 includes vertex 308A, vertex 308B, vertex 308C, and vertex 308D, which are disposed closest to the source location 402 and which are used as vertices that define a first shape 500. Also, each subsequent shape (e.g. second shape 502 and third shape 504) from the source location 402 includes a subsequent set of vertices (e.g., second set 310 and third set 312) that are greater in distance away from the source location 402 than the previous set of vertices (e.g., first set 308) of the previous shape (e.g., first shape 500). For example, the second set 310 includes vertex 310A, vertex 310B, vertex 310C, and vertex 310D. Also, as another example, the third set 312 includes target bound 312A, vertex 312B, and vertex 312C. More specifically, the control system 140 is configured to generate a number of shapes, which are concentric or substantially concentric from the source location 402, based on selected vertices of the occupied zones 306 that are grouped into sets of vertices that are then used to define these shapes. In an example embodiment, the shapes are also defined by a target boundary (e.g., a circular shape or circumferential portion thereof as shown in FIG. 4) for the region. Also, in an example embodiment, the control system 140 selectively generates an odd number of shapes for the maximum number to provide a representation of drivable space, which starts and ends with drivable regions. Moreover, this feature is beneficial in enabling the vehicle 10 to find a way around an occupied region (e.g., an obstacle in the geographic region).

Referring to FIG. 4, as a non-limiting example, the control system 140 determines that the maximum number and/or odd number of concentric shapes for this region is three shapes (i.e., shapes $S_1$, $S_2$, and $S_3$) based at least on the configuration provided by the occupied/unoccupied zones. FIG. 4 illustrates a visualization 300 of the drivable space with respect to the three concentric shapes (i.e., shapes $S_1$, $S_2$, and $S_3$) in which the first shape 500 is shown in FIG. 5A, the second shape 502 is shown in FIG. 5B, and the third shape 504 is shown in FIG. 5C. In an example embodiment, upon identifying and generating each of the concentric shapes for the region, the control system 140 is configured to perform step 210.

At step 210, in an example embodiment, the control system 140 is configured to construct a drivable space that includes at least one section, which is based on the localization data of the vehicle 10. For example, in FIG. 5A, the control system 140 is configured to generate a drivable space that includes at least a first section 500A, which is defined by the first shape 500 that includes the vehicle 10 therein. The first shape 500 has a boundary, which includes the vertex 308A that intersects the ray 400. As shown in FIG. 5A, the first shape 500 is concentric about the source location 402 and defined by bounds that include the first set 308 of vertices (i.e., vertex 308A, vertex 308B, vertex 308C, and vertex 308D) and the target boundary. In FIG. 5A, for instance, this first section 500A refers to a space, which is immediately ahead of the vehicle 10 and which is in a driving direction of the vehicle 10. Also, as shown in FIG. 5A, the first marker is the vertex 308A of the occupied zone 306A, as well as a corresponding vertex 308A of the first shape 500. In this case, the first marker (vertex 308A) includes a point on a boundary line of the occupied zone 306A, thereby being a transition marker on the ray 400. Prior to including the first section 500A in the drivable space, the control system 140 is configured to evaluate the first marker (vertex 308A) on the ray 400 to verify that this is a locale, which includes a transition from an unoccupied zone 304 to an occupied zone 306 relative to the direction of the ray 400. In an example embodiment, upon including or adding this first section 500A of the first shape 500 as a part of the drivable space, the control system 140 is configured to perform step 212.

At step 212, in an example embodiment, the control system 140 is configured to identify a next marker along the ray 400 to evaluate. In general, the control system 140 is configured to identify markers, which include at least a transition marker and a target marker along the ray 400. For example, the control system 140 is configured to identify a transition marker on the ray 400 based on at least a part of a boundary (e.g., vertices and/or other boundary points) of the occupied zones 306 that intersect the ray 400. Also, the control system 140 is configured to identify a target marker on the ray 400 based on a designation of a target boundary for the region. In this case, the target boundary indicates the bounds of the region for which the drivable space will be determined. More specifically, referring to FIG. 4 as an example, after adding the first section 500A and/or after evaluating the first marker (vertex 308A), the control system 140 identifies the second marker (vertex 310A) as the next marker on the ray 400 to be evaluated at step 214. As another example, if the second marker (vertex 310A) was previously evaluated, then the control system 140 identifies the third marker (target bound 312A) as the next marker on the ray to be evaluated at step 214. In an example embodiment, upon performing step 212, the control system 140 is configured to perform step 214.

At step 214, in an example embodiment, the control system 140 is configured to determine whether or not the current marker, as identified at step 212, is a transition marker, which transitions from an unoccupied zone 304 to an occupied zone 306, as taken along the direction of the ray 400. Also, at step 214, the control system 140 is configured to determine if this marker is the target marker of the region. Upon determining that this marker does not transition between an unoccupied zone 304 and an occupied zone 306 along the direction of the ray 400 and upon determining that this current marker is not the target marker, the control system 140 is configured to perform step 216. As a non-limiting example, referring to FIG. 5A, the first marker (vertex 308A) is a transition marker, which transitions from an unoccupied zone 304 to the occupied zone 304A along the direction of the ray 400. That is, the first marker (vertex 308A) is disposed between an unoccupied zone, as delineated from the source location 402 to this first marker (vertex 308A), and an occupied zone, as delineated from this first marker (vertex 308A) to the second marker (vertex 310A). Upon determining that this current marker, which is being evaluated, is disposed between an unoccupied zone 304 at a side of the source location 402 and an occupied zone 306 at a side opposite to the source location 402 (and/or upon determining that the marker is a target marker of the region), the control system 140 is configured to perform step 218.

At step 216, in an example embodiment, the control system 140 is configured to provide an indication that the current section is not a drivable region (i.e., a non-drivable region). For example, in FIG. 5B, upon evaluating the second marker (vertex 310A), which is a transition marker, the control system 140 is configured to determine that this second marker (vertex 310A) transitions from the occupied zone 306A to the unoccupied zone 304 based on a direction of the ray 400. In this regard, for example, the control system 140 is configured to subtract, remove, discount, or exclude this current section (e.g., second section 502A) with respect to the drivable space. As shown in FIG. 5B, the second section 502A corresponds to the second shape 502, which includes this second marker (vertex 310A) on the ray 400. Also, as shown in FIG. 5B, the second shape 502 includes the second set 310 of vertices, which includes vertex 310A, vertex 310B, vertex 310C, and vertex 310D. In an example embodiment, upon accounting for the current section in relation to the drivable space, the control system 140 is configured to perform step 220.

At step 218, in an example embodiment, the control system 140 is configured to provide an indication that the current section, as defined by the corresponding shape, is a drivable region. In this regard, for example, the control system 140 is configured to include or add the current section with respect to the drivable space. As a non-limiting example, in FIG. 5C, for instance, upon determining that the third marker (target bound 312A) is the target marker corresponding to a target boundary of the region, the control system 140 is configured to further include at least the third section 504A (or this "target section") that corresponds to the third marker (target bound 312A) as a part of the drivable space model such that the drivable space includes both the first section 500A (step 210) and the third section 504A as drivable regions while not including the second section 502A (step 216) as a drivable region within the drivable space. In an example embodiment, upon accounting for this current section with respect to the drivable space, the control system 140 is configured to perform step 220.

At step 220, in an example embodiment, the control system 140 is configured to determine if there is another marker along the ray 400 and within the region. In an example embodiment, when there is another marker on the ray 400, the control system 140 is configured to perform step 212. For example, after defining the drivable space based on the second section 502A corresponding to the second marker (vertex 310A), the control system 140 determines that there is another marker (e.g., target bound 312A) on the ray 400. Alternatively, upon examining each of the markers (e.g., vertex 308A, vertex 310A, and target bound 312A) on the ray 400 for the predetermined region, the control system 140 is configured to perform step 222.

At step 222, in an example embodiment, the control system 140 is configured to provide a representation of a drivable space model for the region in real-time. Also, in an example embodiment, the control system 140 is configured to compute a total area of drivable space ($A_{DS}$) in which 'm' represents the number of zones and '$A_{Si}$' represents the area of a particular shape $S_i$.

$$A_{DS} = \Sigma_{i=1}^{m} (-1)^{i-1} A_{S_i} \quad \text{[Equation 3]}$$

For example, the control system 140 is configured to provide this drivable space model to serve as a basis for generating guidance (e.g., a route or driving path) and/or control signals. For instance, in FIG. 2, the environment representation module 160 is configured to provide this drivable space model in real-time to route planning system 170 and/or vehicle motion control system 180. Advantageously, the control system 140 is configured to generate this drivable space model, which consumes significantly less memory than an occupancy grid 302 while also identifying drivable regions in real-time to enable safe guidance and control of the vehicle 10. In this regard, for instance, the control system 140 is configured to generate this drivable space model with a representation of drivable space, which achieves 1-10% less memory usage compared to occupancy-grid based approaches for a comparable angular resolution. The employment of this drivable space model is therefore more efficient and less hardware/software intensive than the employment of an occupancy grid itself.

As described above, the system 100 includes a number of advantageous features, as well as benefits. For example, the system 100 is configured to generate a representation of drivable space for a geographic region in real-time. In addition, the system 100 is configured to capture complex scenes with occluded zones by using an occupancy grid 302 as a basis in generating its representation of drivable space. Also, the system 100 is configured to take into account occupied zones that include detections of static objects, dynamic objects, or both static and dynamic objects. Alternatively, instead of representing drivable space, the system 100 is configurable to generate a representation based on another property (e.g., a particular topographical surface, etc.).

In addition, the system 100 is also configured to provide a compact interface for providing a representation of drivable space (or free space for mobility) based on one or more predetermined features, e.g. occupied/unoccupied zones, any similar types of attributes, or any combination thereof. In this regard, the system 100 provides a useful representation of the environment that generally consumes, for instance, one or two orders of magnitude less interface memory compared to most occupancy-grids with comparable angular resolution. The system 100 is advantageous in being able to provide and implement a drivable space model with a memory footprint that is lower than a memory footprint of the occupancy grid itself. In this regard, the system 100 is configured to provide at least this environment model with a representation of drivable space to contribute to driver-assistance systems, autonomous driving systems, or any suitable driving systems in an efficient manner.

The system 100 is also configured to communicate and provide this drivable space model with this representation of drivable space to another entity in real-time and in a reliable manner via vehicular communication technology, such as dedicated short-range communications (DSRC), vehicle-to-vehicle (V2V) communications, vehicle-to-infrastructure (V2I) communications, and/or any suitable communication means. In this regard, for example, the system 100 is configured to provide this representation of drivable space to other entities (e.g. other vehicles, other traffic participants, external infrastructures, etc.) in a relatively quick manner and with relatively low memory requirements.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method comprising:
   obtaining, via a control system with at least one processing device, an occupancy grid for a region based on sensor data and map data in which the occupancy grid indicates at least an occupied zone and an unoccupied zone for the region;
   generating, via the control system, a reference tool on the occupancy grid in which the reference tool extends from a source location positioned on the occupancy grid and extends along the occupancy grid in a first direction, the source location corresponding to localization data of a vehicle and the first direction corresponding to a driving direction of the vehicle;
   identifying, via the control system, markers on the occupancy grid using the reference tool, the markers being the boundary data of the occupied zone that intersect the reference tool at different locations on the occupancy grid, the markers including a first transition marker exhibiting a first type of transition from the unoccupied zone to the occupied zone along the first direction and a second transition marker exhibiting a second type of transition from the occupied zone to the unoccupied zone along the first direction such that the first transition marker is positioned between the source location and the second transition marker on the reference tool along the first direction;
   identifying, via the control system, a first section associated with the first transition marker as being a drivable region upon determining that the first transition marker exhibits the first type of transition;
   identifying, via the control system, a second section associated with the second transition marker as being a non-drivable region upon determining that the second transition marker exhibits the second type of transition;

generating, via the control system, a representation of drivable space in real-time based on computations involving the drivable region and the non-drivable region; and providing, via the control system, guidance to the vehicle based on localization data of the vehicle in relation to the representation of the drivable space.

2. The method of claim 1, further comprising:
generating control signals to control the vehicle based on a route that is within bounds of the drivable space.

3. The method of claim 1, wherein the computations include:
incorporating the first section into the drivable space; and
removing the second section from the drivable space.

4. The method of claim 1, wherein:
the markers further include a target marker, the target marker indicating a target bound for the region; and
the representation of the drivable space is generated upon incorporating a target section that corresponds to the target marker as another drivable region to the drivable space.

5. The method of claim 1, further comprising:
identifying, via the control system, vertices of the occupied zone;
identifying, via the control system, the first section based on a first shape that includes a first set of vertices from among the vertices of the occupied zone; and
identifying, via the control system, the second section based on a second shape that is concentric with the first shape and includes a second set of vertices from among the vertices of the occupied zone.

6. The method of claim 5, wherein:
the first transition marker is a vertex from the first set of vertices; and
the second transition marker is a vertex from the second set of vertices.

7. The method of claim 1, further comprising:
obtaining the sensor data from a plurality of sensors on the vehicle, the plurality of sensors including at least a light detection and ranging (LIDAR) sensor, a satellite-based sensor, and a camera system.

8. A system comprising:
a sensor system including a plurality of sensors;
and a control system communicatively connected to the sensor system, the control system including at least one electronic processor and being configured to obtain an occupancy grid for a region based on sensor data and map data in which the occupancy grid indicates at least an occupied zone and an unoccupied zone for the region;
generate a reference tool on the occupancy grid in which the reference tool extends from a source location positioned on the occupancy grid and extends along the occupancy grid in a first direction, the source location corresponding to localization data of a vehicle and the first direction corresponding to a driving direction of the vehicle;
identify markers on the occupancy grid using the reference tool, the markers being the boundary data of the occupied zone that intersect the reference tool at different locations on the occupancy grid, the markers including a first transition marker exhibiting a first type of transition from the unoccupied zone to the occupied zone along the first direction and a second transition marker exhibiting a second type of transition from the occupied zone to the unoccupied zone along the first direction such that the first transition marker is positioned between the source location and the second transition marker on the reference tool along the first direction;
identify a first section associated with the first transition marker as being a drivable region upon determining that the first transition marker exhibits the first type of transition;
identify a second section associated with the second transition marker as being a non-drivable region upon determining that the second transition marker exhibits the second type of transition;
generate a representation of drivable space in real-time based on computations involving the drivable region and the non-drivable region; and provide guidance to the vehicle based on localization data of the vehicle in relation to the representation of the drivable space.

9. The system of claim 8, wherein the control system is configured to generate control signals to control the vehicle based on a route that is within bounds of the drivable space.

10. The system of claim 8, wherein:
the markers include a target marker, the target marker indicating a target bound for the region; and
the representation of the drivable space is generated upon incorporating a target section that corresponds to the target marker as another drivable region to the drivable space.

11. The system of claim 8, wherein the computations include:
incorporating the first section into the drivable space; and
removing the second section from the drivable space.

12. The system of claim 8, wherein the control system is configured to:
identify, via the control system, vertices of the occupied zone;
identify, via the control system, the first section based on a first shape that includes a first set of vertices from among the vertices of the occupied zone; and
identify, via the control system, the second section based on a second shape that is concentric with the first shape and includes a second set of vertices from among the vertices of the occupied zone.

13. The system of claim 12, wherein:
the first transition marker is a vertex from the first set of vertices; and
the second transition marker is a vertex from the second set of vertices.

14. The system of claim 8, wherein the sensor system includes at least a light detection and ranging (LIDAR) sensor, a satellite-based sensor, and a camera system.

15. A non-transitory computer readable medium having computer readable instructions that are executable by a computer processor to implement a method comprising:
obtaining an occupancy grid for a region based on sensor data and map data in which the occupancy grid indicates an occupied zone and an unoccupied zone for the region;
generating a reference tool on the occupancy grid in which the reference tool extends from a source location positioned on the occupancy grid and extends along the occupancy grid in a first direction corresponding to a driving direction of a vehicle;
identifying markers on the occupancy grid using the reference tool, the markers being the boundary data of the occupied zone that intersect the reference tool at different locations on the occupancy grid, the markers including a first transition marker exhibiting a first type of transition from the unoccupied zone to the occupied zone along the first direction and a second transition marker exhibiting a second type of transition from the occupied zone to the unoccupied zone along the first direction such that the first transition marker is positioned between the source location and the second transition marker on the reference tool along the first direction;

identifying a first section associated with the first transition marker as being a drivable region upon determining that the first transition marker exhibits the first type of transition;

identifying a second section associated with the second transition marker as being a non-drivable region upon determining that the second transition marker exhibits the second type of transition;

generating a representation of drivable space in real-time based on computations involving the drivable region and the non-drivable region; and providing guidance to the vehicle based on localization data of the vehicle in relation to the representation of the drivable space.

16. The non-transitory computer readable medium of claim 15, wherein: the markers include a target marker, the target marker indicating a target bound for the generation of the drivable space; and the representation of the drivable space is generated upon incorporating a target section that corresponds to the target marker as another drivable region to the drivable space.

17. The non-transitory computer readable medium of claim 15, wherein the method further comprises: identifying vertices of the occupied zone; identifying the first section based on a first shape that includes a first set of vertices from among the vertices of the occupied zone; and identifying the second section based on a second shape that is concentric with the first shape and includes a second set of vertices from among the vertices of the occupied zone.

18. The non-transitory computer readable medium of claim 17, wherein: the first transition marker is a vertex from the first set of vertices; and the second transition marker is a vertex from the second set of vertices.

* * * * *